J. H. SPRAGUE.
WIND SHIELD.
APPLICATION FILED JAN. 28, 1909.

933,496.

Patented Sept. 7, 1909.
2 SHEETS—SHEET 1.

WITNESSES
Edw. Thorpe
C. W. Fairbanks

INVENTOR
James H. Sprague
BY Munn & Co
ATTORNEYS

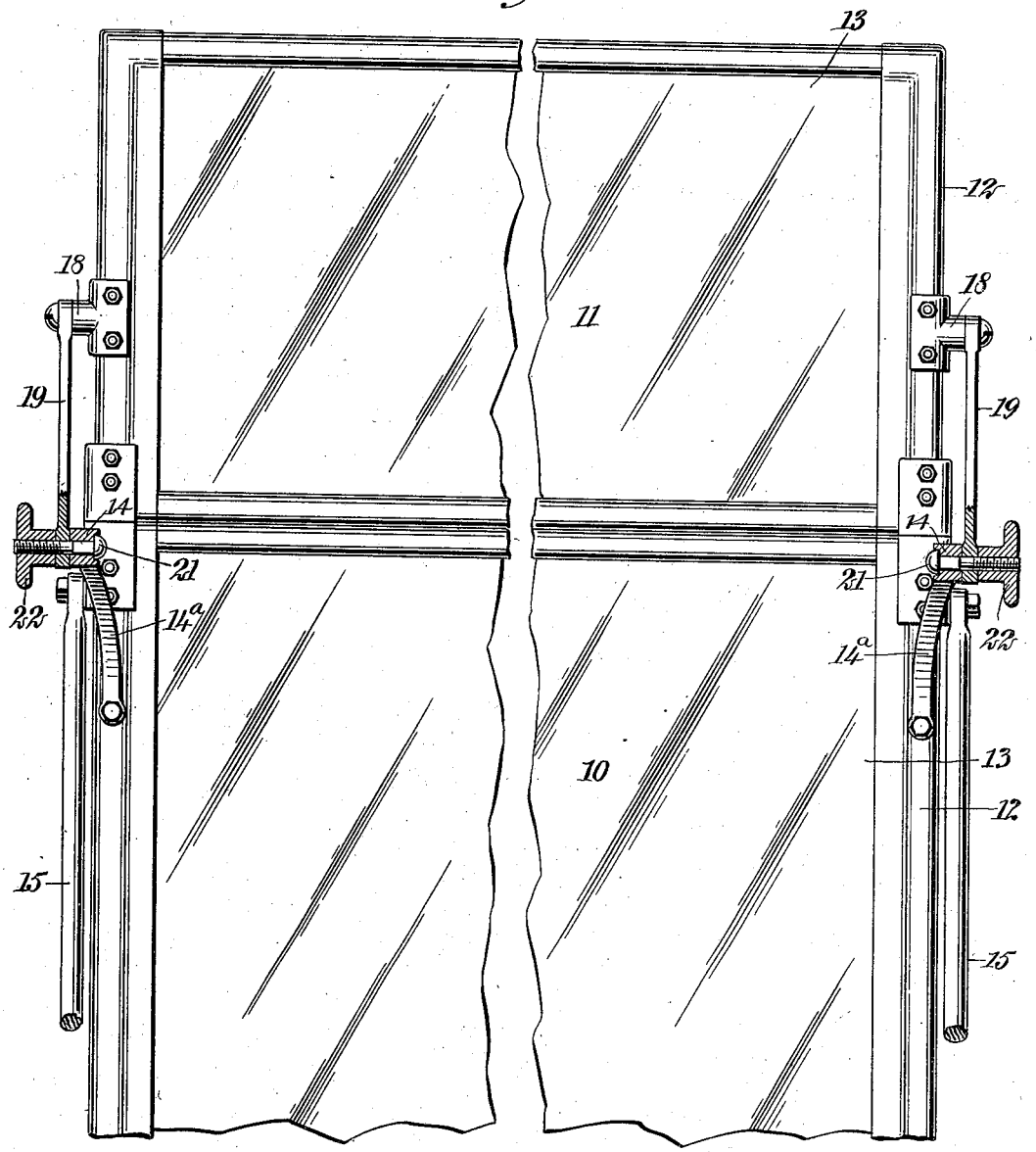

UNITED STATES PATENT OFFICE.

JAMES H. SPRAGUE, OF NORWALK, OHIO.

WIND-SHIELD.

933,496.      Specification of Letters Patent.     Patented Sept. 7, 1909.

Application filed January 28, 1909. Serial No. 474,649.

*To all whom it may concern:*

Be it known that I, JAMES H. SPRAGUE, a citizen of the United States, and a resident of Norwalk, in the county of Huron and State of Ohio, have invented a new and Improved Wind-Shield, of which the following is a full, clear, and exact description.

This invention relates to certain improvements in wind shields for use on vehicles, and more particularly to that type of shield which is formed of a lower stationary section and an upper movable section.

My invention involves a new and improved form of supporting means for holding the two sections in any desired position in respect to each other.

Reference is to be had to the accompanying drawings, forming a part of this specification, in which similar characters of reference indicate corresponding parts in all the figures, and in which—

Figure 1:
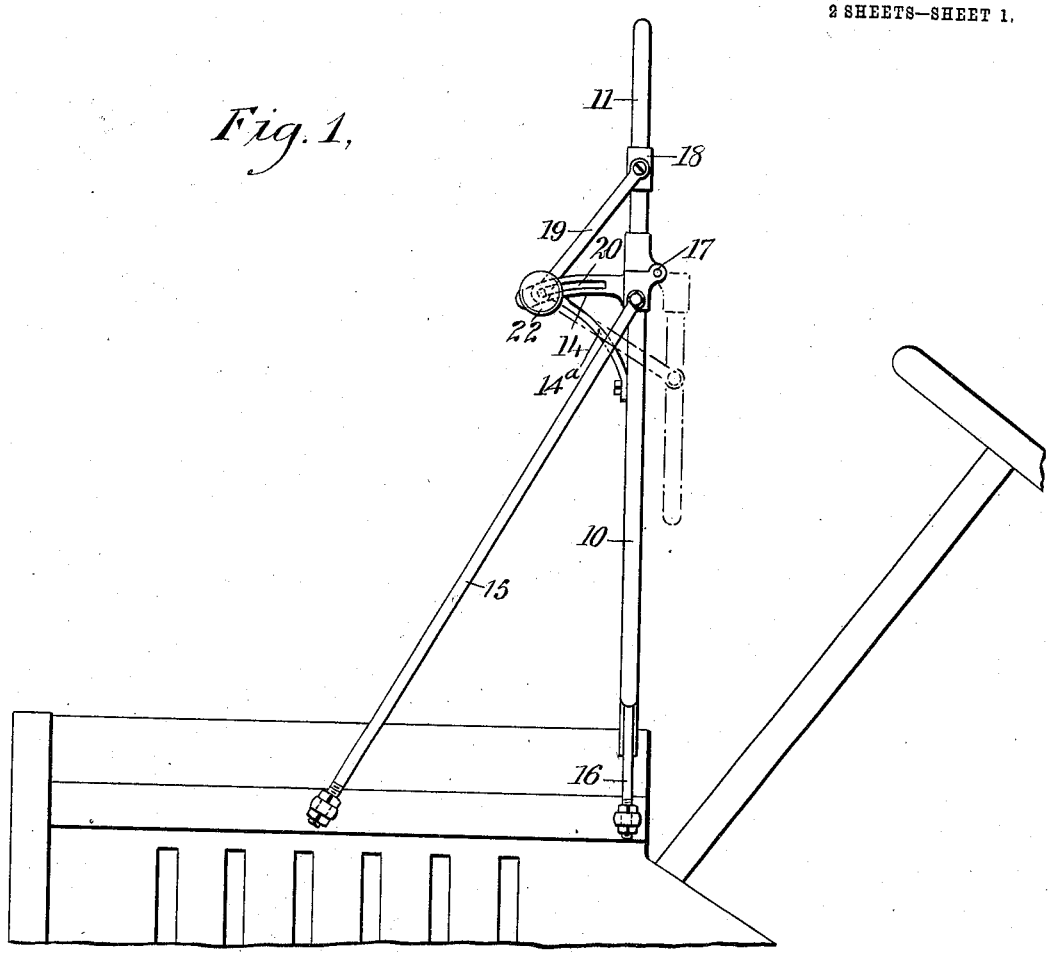
Figure 2:
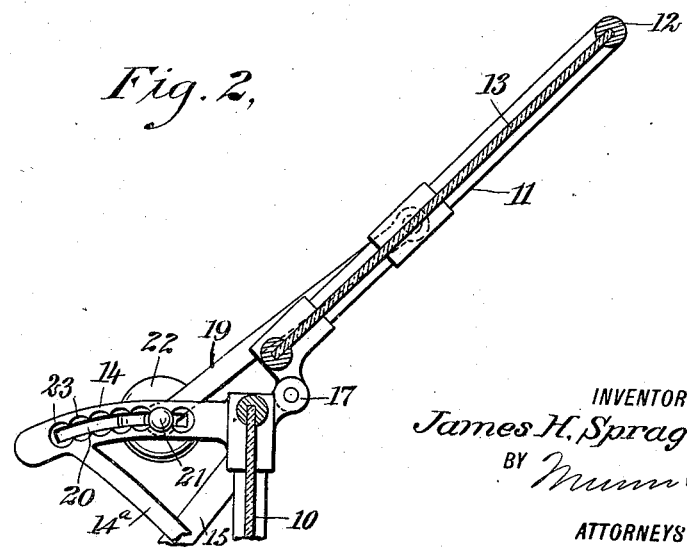

Figure 1 is a side elevation of a portion of a motor vehicle having a wind shield constructed in accordance with my invention; Fig. 2 is a section through the upper portion of the shield and on an enlarged scale; and Fig. 3 is a front view of the shield, a portion of the supporting means for the upper section being broken away.

Wind shields have been designed in which the upper section has been hinged to the lower section and supported by braces pivoted to the upper section and having their lower ends sliding on braces for the lower section, and wind shields have also been designed in which the two sections were connected together by links at their ends, but in my present construction, I hinge the two sections together and support the upper section by links pivoted thereto and having their lower ends slidably connected to brackets on the lower section and independent of the braces which support said lower section.

In the specific form illustrated, I employ a stationary lower section 10, and a movable upper section 11, each having a peripheral frame 12 and a sheet of glass or other transparent material 13. The details of the construction of the frame and the mounting for the glass constitute no portion of the invention hereinafter claimed, and may be of any construction suitable for the purpose.

The lower section 10 is provided with forwardly-extending brackets 14, 14, rigidly secured to the frame at opposite sides and adjacent the upper edge. The two brackets 14 extend forwardly substantially parallel and lie substantially in a horizontal plane. The forward ends of the brackets may be supported from the lower section by diagonal brace rod 14ª, the outer ends of which are secured to the outer ends of the brackets 14, the lower ends of which are secured to the lower section. If the brackets 14 are made sufficiently large and rigid, these braces 14ª may be omitted. The lower section is preferably braced or supported adjacent its upper edge by supporting rods or braces 15, each having its lower end connected to a stationary portion of the vehicle, and having its upper end connected to the lower section but independent of the brackets 14. The brackets 14 constitute no portion of the brace of the lower section and are separate and distinct therefrom. The lower edge of the lower section may be secured to the vehicle by any suitable tie-rods 16, which together with the braces 15, hold the lower section stationary and rigid.

The frame of the upper section 11 is hinged to the frame of the lower section 10 at their meeting edges and adjacent the opposite vertical edges of the shield. Any suitable form of hinge 17 may be employed, which will permit the movable section to be swung upwardly into a position in alinement with the lower section or to be swung rearwardly and downwardly to a position substantially parallel with the lower section, as indicated in Fig. 1. The frame of the upper section at the opposite vertical edges thereof and intermediate the upper and lower edges is provided with small brackets 18, 18, rigidly clamped in place, and to the outer sides of these brackets are pivoted two links 19, 19. The links extend forwardly and downwardly and at their lower ends are adjustably connected to the brackets 14, so as to lock the upper shield against movement. The brackets 14 are each provided with a slot 20 extending lengthwise thereof, and each link 19 at its lower end carries a bolt 21 disposed in a plane parallel to the plane of the shield and extending through the corresponding slot 20. The bolts are carried by the links and are movable lengthwise of the slots. At the outer end of each bolt there is a nut in the form of a hand wheel 22, by means of which the lower end of the link may be clamped to the side of the bracket and the bolt and link prevented from moving in respect to the bracket. The threads on the outer end of one bolt have an opposite pitch from the threads on the outer end of the other bolt, so that to loosen both of the bolts, the hand-wheels 22 may be turned in the same direction. The slots 20 are of such length and the brackets 14 are so disposed that when the section 11 is in either its raised or its lowered position, the bolts will lie at the forward ends of their slots and when the section 11 is in a substantially horizontal position, the bolts will be at the rear ends of their slots. Thus, the front ends of the slots constitute stops and limit the movements of the links and serve to hold the upper section against movement past its limiting position, independently of the tightening of the bolts. The side of each bracket opposite to its link, that is, the side which receives the head of the bolt, is preferably roughened, notched, or provided with a series of recesses 23, as illustrated particularly in Fig. 2, whereby the upper section may be more effectively locked in an intermediate position and the bolts prevented from slipping along the slots.

Having thus described my invention, I claim as new and desire to secure by Letters Patent:

A wind shield, comprising a lower stationary section, a bracket extending substantially horizontally from said lower section adjacent the upper edge thereof and having a slot extending longitudinally thereof, an upper section hinged to said lower section and movable to a position substantially parallel to the lower section and upon the side thereof opposite to said bracket, a link having one end pivoted to the upper section, a bolt extending through the opposite end of said link at substantially right angles thereto and through said slot and constituting a pivotal and sliding connection between the link and bracket, and a supporting brace for the lower section independent of the bracket.

In testimony whereof I have signed my name to this specification in the presence of two subscribing witnesses.

JAMES H. SPRAGUE.

Witnesses:
JOHN A. STRATTON,
F. A. YOUNG.